(12) United States Patent
Archer et al.

(10) Patent No.: US 11,882,632 B2
(45) Date of Patent: Jan. 23, 2024

(54) LED DRIVER WITH INTEGRATED LED LIGHTING FOR HUMAN CENTRIC BLACK BODY DIMMING

(71) Applicant: ERP POWER, LLC, Moorpark, CA (US)

(72) Inventors: Michael Archer, Moorpark, CA (US); Louis Chen, Simi Valley, CA (US); James H. Mohan, Valencia, CA (US)

(73) Assignee: ERP POWER, LLC, Moorpark, CA (US)

( * ) Notice: Subject to any disclaimer, the term of this patent is extended or adjusted under 35 U.S.C. 154(b) by 0 days.

(21) Appl. No.: 17/473,914

(22) Filed: Sep. 13, 2021

(65) Prior Publication Data

US 2022/0086978 A1    Mar. 17, 2022

Related U.S. Application Data

(60) Provisional application No. 63/079,981, filed on Sep. 17, 2020.

(51) Int. Cl.
| | |
|---|---|
| H05B 45/10 | (2020.01) |
| H05B 45/20 | (2020.01) |
| H05B 45/32 | (2020.01) |
| H05B 45/38 | (2020.01) |
| H05B 45/46 | (2020.01) |
| H05B 45/382 | (2020.01) |
| H05B 45/325 | (2020.01) |

(52) U.S. Cl.
CPC ............. *H05B 45/20* (2020.01); *H05B 45/10* (2020.01); *H05B 45/325* (2020.01); *H05B 45/382* (2020.01); *H05B 45/46* (2020.01)

(58) Field of Classification Search
None
See application file for complete search history.

(56) References Cited

U.S. PATENT DOCUMENTS

| | | | |
|---|---|---|---|
| 9,125,259 B1* | 9/2015 | Xiong | H05B 45/382 |
| 10,136,487 B2* | 11/2018 | Wang | H05B 45/10 |
| 10,880,968 B1* | 12/2020 | Zhou | H05B 45/20 |
| 2010/0295472 A1* | 11/2010 | Wibben | H02M 3/158 |
| | | | 307/31 |
| 2012/0188794 A1* | 7/2012 | Chang | H05B 45/3575 |
| | | | 363/16 |
| 2015/0116379 A1* | 4/2015 | Lim | G09G 3/342 |
| | | | 345/691 |
| 2017/0202062 A1* | 7/2017 | Choi | H05B 45/10 |
| 2019/0320515 A1* | 10/2019 | Sadwick | H05B 45/00 |

* cited by examiner

*Primary Examiner* — Dedei K Hammond
(74) *Attorney, Agent, or Firm* — Lewis Roca Rothgerber Christie LLP

(57) ABSTRACT

A multi-channel power supply system including a power supply circuit configured to generate a drive signal for powering a plurality of color channels based on an input power signal, a first current control circuit coupled to a first color channel of the plurality of color channels and configured to adjust a first channel current of the first color channel based on the drive signal and a first reference signal, and a channel controller configured generate the first reference signal based on a color temperature according to a black body curve.

20 Claims, 3 Drawing Sheets

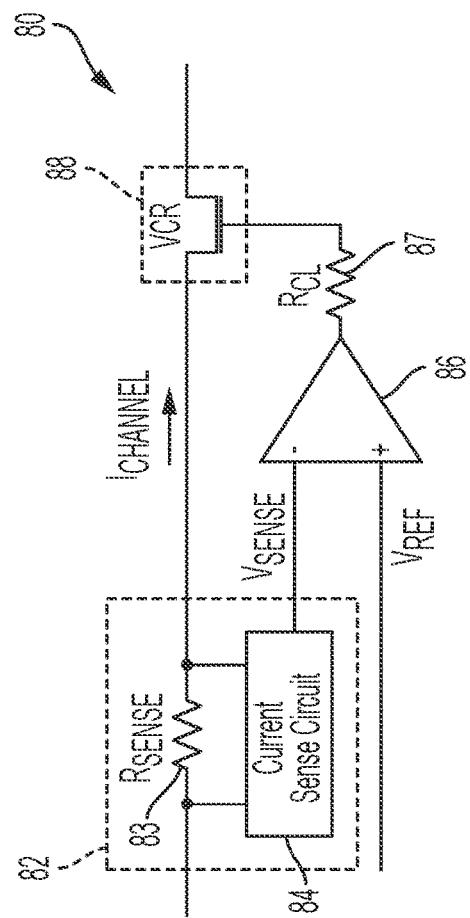
FIG. 2
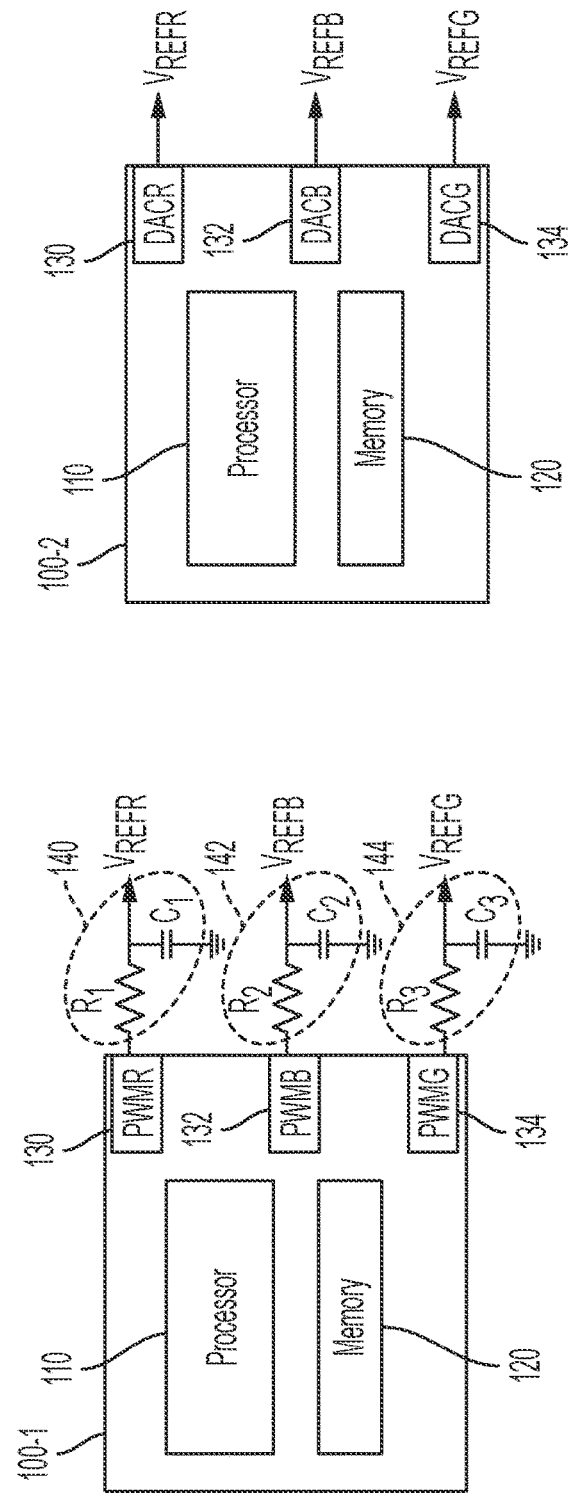
FIG. 3A
FIG. 3B

LED DRIVER WITH INTEGRATED LED LIGHTING FOR HUMAN CENTRIC BLACK BODY DIMMING

CROSS-REFERENCE TO RELATED APPLICATION(S)

This application claims priority to, and the benefit of, U.S. Provisional Application No. 63/079,981 ("LED DRIVER WITH INTEGRATED LED LIGHTING FOR HUMAN CENTRIC BLACK BODY DIMMING"), filed on Sep. 17, 2020, the entire content of which is incorporated herein by reference.

The present application is also related to U.S. patent application Ser. No. 17/473,920 ("MULTI-CHANNEL CONTROL FROM A SINGLE RESONATE WINDING", filed Sep. 13, 2021, which claims priority to and the benefit of U.S. Provisional Application No. 63/079,968 ("MULTI-CHANNEL CONTROL FROM A SINGLE RESONATE WINDING"), filed on Sep. 17, 2020, the entire contents of which are incorporated herein by reference.

FIELD

Aspects of the present disclosure are related to light emitting diode (LED) drivers.

BACKGROUND

Lighting devices that are based on light-emitting diodes (LEDs) offer a viable alternative to traditional lighting sources, such as fluorescent, HID, and incandescent lamps. LEDs offer a number of advantages including high energy conversion, high optical efficiency, long durability, and lower operating costs. Recent LEDs provide efficient full-spectrum lighting sources that allow a variety of lighting effects and colors. Some of these sources include one or more color channels, which produce different colors (e.g., red, green, and blue), as well as a processor for independently controlling the output of the color channels in order to generate a variety of colors and color-changing lighting effects. A desired color effect of the lighting unit may be controlled by adjusting the current through the color channels.

The above information disclosed in this Background section is only for enhancement of understanding of the disclosure, and therefore it may contain information that does not form the prior art that is already known to a person of ordinary skill in the art.

SUMMARY

Aspects of embodiments of the present disclosure are directed to a multi-channel power supply system for driving a multi-color light source and which is capable of mimicking the light temperature of the sun at various points in the day. As a result, the emitted light may make the surrounding environment more appealing to users and may help with regulating the circadian rhythm of users. In some embodiments, multi-channel power supply system is capable of driving red, green, and blue channels, and a channel controller performs color mixing of the red, green, and blue channels, when adjusting the light intensity of the lights, to accurately follow the black body curve.

Aspects of embodiments of the present disclosure are directed to a multi-channel power supply system that utilizes a feedback loop, which monitors a dominant color channel (e.g., the green color channel) to control the headroom voltage of the system. This allows the multi-channel power supply system to deliver the desired output current and voltage for all independent color channels, while preventing large dissipation of power across voltage-controller resistors (VCRs) of the color channels, which can also prevent or reduce damage to the VCRs.

According to some embodiments, there is provided a multi-channel power supply system including: a power supply circuit configured to generate a drive signal for powering a plurality of color channels based on an input power signal; a first current control circuit coupled to a first color channel of the plurality of color channels and configured to adjust a first channel current of the first color channel based on the drive signal and a first reference signal; and a channel controller configured generate the first reference signal based on a color temperature according to a black body curve.

In some embodiments, the first color channel includes one or more light emitting diodes (LEDs) having a red color, a blue color, or a green color, the one or more LEDs being configured to output a light intensity corresponding to the first channel current.

In some embodiments, the first current control circuit includes: a current sensor configured to sense the first channel current of the first color channel and to generate a first sense signal; an error amplifier configured to receive the first sense signal and the first reference signal, and to generate a gate control signal based on a difference between the first reference signal and the first sense signal; and a voltage-controlled resistor (VCR) configured to adjust the first channel current by dynamically adjusting a resistance of the VCR based on the gate control signal.

In some embodiments, the current sensor includes: a sense resistor electrically coupled in series with the VCR and the first color channel; and a current sense circuit configured to generate the first sense signal based on a voltage drop across the sense resistor.

In some embodiments, the resistance of the VCR varies from 5Ω to 10Ω depending on the gate control signal.

In some embodiments, the VCR includes: a field effect transistor (FET) having a gate electrically coupled to an output of the error amplifier, wherein the error amplifier is further configured to maintain the FET in an ohmic region of operation.

In some embodiments, the channel controller is further configured to generate the first reference signal based on a dimmer setting from a dimming controller.

In some embodiments, the color temperature is based on at least one of a dimmer setting and a time of day, and the channel controller is configured to generate the first reference signal based on the color temperature by referencing a lookup table or a formula.

In some embodiments, the channel controller includes: a pulse-width modulation (PWM) generator configured to generate a PWM signal corresponding to the first reference signal; and a low-pass filter configured to filter the PWM signal to generate the first reference signal.

In some embodiments, the channel controller includes: a digital circuit configured to generate a digital signal corresponding to the first reference signal; and a digital-to-analog converter (DAC) configured to convert the digital signal to the first reference signal.

In some embodiments, the multi-channel power supply system further includes: a first rectifier coupled to a secondary winding of the power supply circuit and configured to prevent a reverse current at the first color channel; and a first low pass filter coupled between the first rectifier and the first color channel and configured to produce the first channel current as a first DC current based on the drive signal.

In some embodiments, the multi-channel power supply system further includes: a second current control circuit coupled to a second color channel of the plurality of color channels and configured to adjust a second channel current of the second color channel based on the drive signal and a second reference signal; and a third current control circuit coupled to a third color channel of the plurality of color channels and configured to adjust a third channel current of the third color channel based on the drive signal and a third reference signal, wherein the channel controller is further configured generate the second and third reference signals based on the color temperature.

In some embodiments, the first color channel includes one or more green light emitting diodes (LEDs), the second color channel includes one or more blue LEDs, and the third color channel includes one or more red LEDs.

In some embodiments, the multi-channel power supply system further includes: a second rectifier coupled to a secondary winding of the power supply circuit and configured to prevent a reverse current at the second color channel; a second low pass filter coupled between the second rectifier and the second color channel and configured to produce the second channel current as a second DC current based on the drive signal;

a third rectifier coupled to the secondary winding of the power supply circuit and configured to prevent a reverse current at the third color channel; and a third low pass filter coupled between the third rectifier and the third color channel and configured to produce the third channel current as a third DC current based on the drive signal.

In some embodiments, the first channel current is greater than or equal to each of the second and third channel currents.

In some embodiments, the first color channel has a forward voltage that is greater than or equal to that of each of the second and third color channels.

In some embodiments, wherein the power supply circuit includes: a voltage regulator; and a transformer having a primary winding coupled to the voltage regulator and a secondary winding electrically isolated from the primary winding and coupled to the first current control circuit.

In some embodiments, the multi-channel power supply system further includes: a rectifier circuit configured to rectify the input power signal to generate a rectified signal having a single polarity, wherein the power supply circuit is configured to generate the drive signal based on the rectified signal.

In some embodiments, the rectifier circuit is a bridge rectifier and the input power signal is an alternating-current (AC) signal.

According to some embodiments, there is provided a multi-channel power supply system including: a power supply circuit configured to generate a drive signal for powering a plurality of color channels based on an input power signal, the plurality of color channels including a red color channel, a blue color channel, and a green color channel; a first current control circuit coupled to the green color channel and configured to adjust a first channel current of the green color channel based on the drive signal and a first reference signal; a second current control circuit coupled to the blue color channel and configured to adjust a second channel current of the blue color channel based on the drive signal and a second reference signal; a third current control circuit coupled to the red color channel and configured to adjust a third channel current of the red color channel based on the drive signal and a third reference signal; and a channel controller configured generate the first, second, and third reference signals based on a color temperature according to a black body curve.

BRIEF DESCRIPTION OF THE DRAWINGS

The accompanying drawings, together with the specification, illustrate example embodiments of the present disclosure, and, together with the description, serve to explain the principles of the present disclosure.

FIG. 2 illustrates a schematic diagram of a current control system of the multi-channel power supply system, according to some embodiments of the present disclosure.

FIGS. 3A-3B illustrate schematic diagrams of various implementations of channel controllers of the multi-channel power supply system, according to some embodiments of the present disclosure.

DETAILED DESCRIPTION

Figure 1:
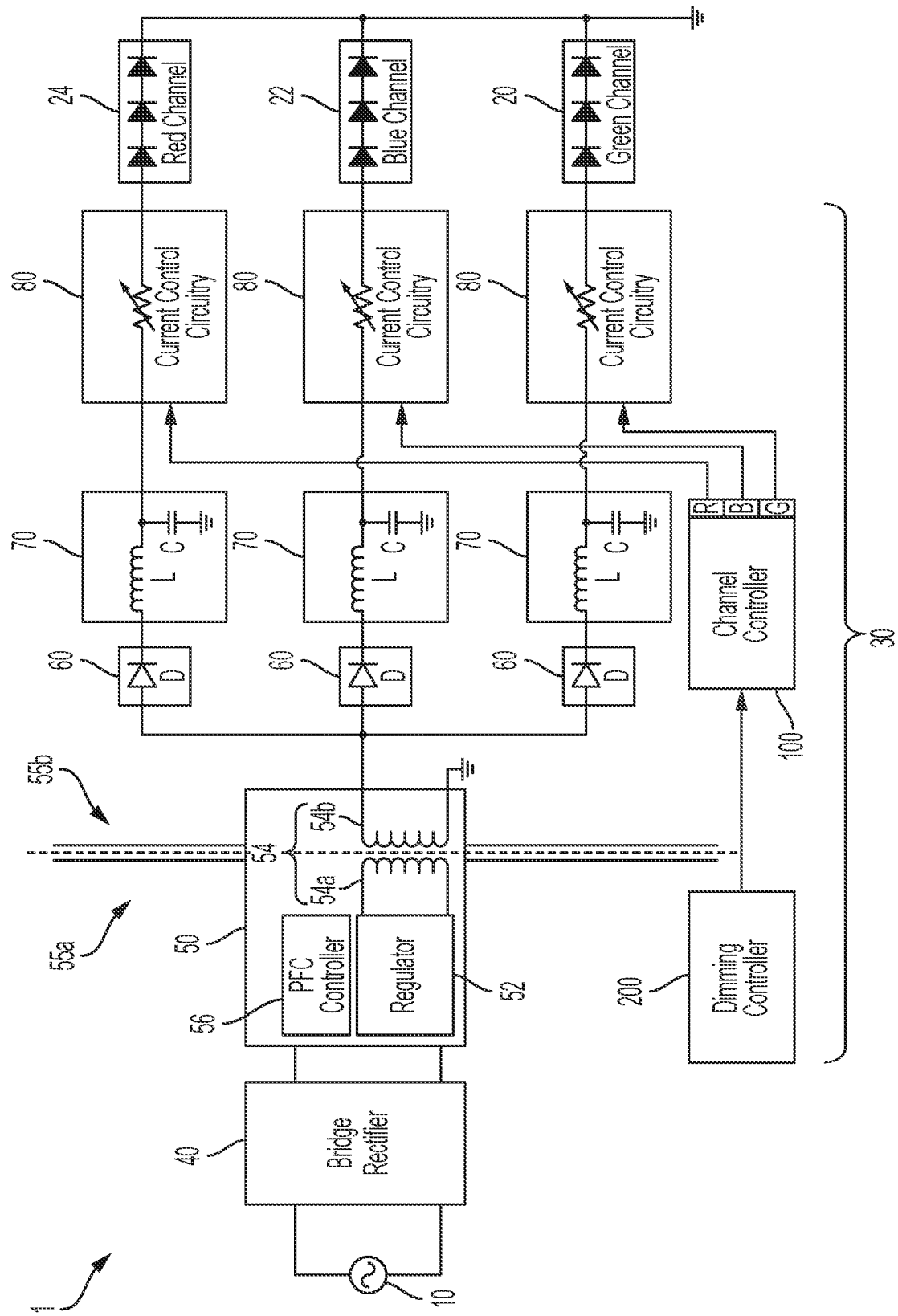
FIG. 1 illustrates a lighting system including a multi-channel power supply system, according to some example embodiments of the present disclosure.

The detailed description set forth below is intended as a description of example embodiments of a multi-channel power supply system, provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the spirit and scope of the disclosure. As denoted elsewhere herein, like element numbers are intended to indicate like elements or features.

Aspects of embodiments of the present disclosure are directed to a multi-channel power supply system for driving a multi-color light source and which is capable of mimicking the light temperature (e.g., in kelvin) of the sun at various point in the day. As a result, the emitted light may make the surrounding environment more appealing to users and may help with regulating the circadian rhythm of users. As an example, the temperature of the light produced by the multi-channel power supply system may be substantially the same as that of the sun at noon when the driver is emitting light at maximum brightness. This light may be white and blue in color. In some embodiments, the temperature of the light follows the black body curve so that, for example, lower intensities produce light similar to that of the sun at sunset. This light may be more red and orange in color.

According to some embodiments, the multi-channel power supply system is capable of driving red, green, and blue channels, and a channel controller performs color mixing of the red, green, and blue channels, when adjusting the light intensity of the lights, to accurately follow the black body curve. The channel controller, which has an integrated processor, may be able to perform the color mixing more accurately than that using analog circuitry. This is because the relationships between the different colors are not linear, and are defined by higher order equations, which are difficult to implement with analog circuitry. Additionally, utilizing a digital processor allows for many different calibration points, which can be very difficult to replicate in an analog circuit.

In some embodiments, the multi-channel power supply system utilizes a feedback loop that monitors a dominant color channel (e.g., the green color channel) to control the headroom voltage of the system. This allows the multi-channel power supply system to deliver the desired output current and voltage for all independent color channels, while preventing large dissipation of power across voltage-controller resistors (VCRs) of the color channels, which can also prevent or reduce damage to the VCRs. As the dominant channel (e.g., green channel) and non-dominant channels (e.g., red and blue channels) are all derived from the same output winding of a power supply circuit, altering the headroom voltage for the entire system can be performed with a single control loop.

Aspects of embodiments of the present disclosure are directed to a lighting system that incorporates the multi-channel power supply system and a multi-color/channel onto a single PCB. This allows for space saving as all components can be housed in a single fixture.

FIG. 1 illustrates a lighting system including a multi-channel power supply system, according to some example embodiments of the present disclosure.

According to some embodiments, the lighting system 1 includes an input source 10, a plurality of color channels (e.g., a plurality of LED channels) 20, 22, and 24, and a multi-channel power supply system 30 for powering and controlling the brightness/intensity of the color channels 20, 22, and 24.

The input source 10 may include an alternating current (AC) power source that may operate at a voltage of 100 Vac, a 120 Vac, a 240 Vac, or 277 Vac, for example. The input source 10 may also include a dimmer electrically powered by said AC power sources. The dimmer may modify (e.g., cut/chop a portion of) the input AC signal according to a dimmer level before sending it to the power supply system 30, and thus variably reduces the electrical power delivered to the power supply system 30 and the color channels 20, 22, and 24. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like.

In some embodiments, the plurality of color channels includes a first channel (e.g., a green channel) 20, a second channel (e.g., a blue channel) 22, and a third channel (e.g., a red channel) 24. Each channel may include one or more light-emitting-diodes (LEDs) of the corresponding colors (e.g., red, green, or blue LEDs). While in some embodiments, the first through third color channels 22-24 represent RGB colors, embodiments of the present disclosure are not limited thereto, and the plurality of channels may include any suitable number of color channels. Further, embodiments, of the present disclosure are not limited to LEDs, and in some examples, other solid-state lighting devices may be employed.

In some embodiments, the multi-channel power supply system 30 includes a rectifier 40, a power supply circuit 50, a plurality of rectifiers 60, a plurality of filters 70, a plurality of current control circuits 80, and a channel controller 100.

The rectifier 40 may provide a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The power supply circuit 50 converts the rectified AC signal generated by the rectifier 40 into a drive signal for powering the plurality of color channels 20, 22, and 24. In some embodiments, the power supply circuit 50 includes a voltage regulator 52 for maintaining (or attempting to maintain) a constant DC bus voltage on its output while drawing a current that is in phase with and at the same frequency as the line voltage (by virtue of the PFC circuit). A transformer 54 inside the power supply circuit 50 produces the desired output voltage from the DC bus. In some examples, the power supply circuit 50 may include a PFC circuit 56 for improving (e.g., increasing) the power factor of the load on the input source 10 and reducing the total harmonic distortions (THD) of the power supply system 30. The power supply circuit 50 has a primary side 55a and a secondary side 55b that is electrically isolated from, and inductively coupled to, the primary side 55a. The primary and secondary sides 55a and 55b may correspond to the primary and secondary windings 54a and 54b of the transformer 54.

According to some embodiments, the multi-channel power supply system 30 drives the plurality of color channels 20, 22, and 24 to produces light temperatures that follow the blackbody curve. In so doing, the multi-channel power supply system 30 may perform color mixing of, for example, red, blue, and green light to achieve the desired light temperature. In some embodiments, the multi-channel power supply system 30 determines the color temperature based on a dimmer setting, a time of day, or a combination thereof.

In some embodiments, the driving current of each of the plurality of color channels 20, 22, and 24 may be derived from the same secondary winding 54b of the transformer 54. As the cost of the magnetic components may be directly proportional to the labor and number of windings added to the components, limiting the number of windings used in transformer 54 may reduce the cost of the multi-channel power supply system 30 in a significant manner. By driving all color channels from the same secondary winding 54b, as opposed to driving each channel off of a separate secondary winding, the multi-channel power supply system 30 may utilize a smaller transformer, which can reduce the overall package size of the overall lighting system 1.

While the plurality of color channels 20, 22, and 24 are driven by the same winding, the channel current of each color channel is independent of the other color channels. This independent control of the channel currents is enabled by utilizing a separate/different current control circuit 80 for each color channel 20/22/24.

According to some embodiments, each color channel 20/22/24 has a dedicated rectifier (e.g., diode) 60 and filter 70, which convert the AC driving signal output by the secondary winding 54a of the transformer 54 into a DC channel current for driving the corresponding color channel 20/22/24. The anodes of the rectifiers 60 may all be connected (e.g., directly connected) to the same output terminal of the power supply circuit 50. As the different color channels may have different forward voltages (e.g., the green color channel 20 may have a forward voltage higher than those of the blue and red color channels 22 and 24), having separate rectifiers 60 for each color channel allows for each channel to be driven by a different voltage. The rectifiers 60 also prevent backflow of current from one color channel 20/22/24 to another, which facilitates the accurate and individual control of channel current.

According to some embodiments, each of the plurality of current control circuits 80 is configured to adjust the channel current of the corresponding color channel 20/22/24 based on the drive signal from the power supply circuit 50 and a corresponding reference signal from the channel controller 100. The channel controller 100 is configured to generate the reference signals for the plurality of current control circuits 80 based on a desired color temperature.

While FIG. 1 illustrates the current control circuitry 80 in each channel as being coupled between the filter 70 and the corresponding color channel 20/22/24, embodiments of the present disclosure are not limited thereto, and the current control circuitry 80 may be positioned between the corresponding color channel and the ground reference (e.g., between the cathode of the last LED in color channel and the ground reference point).

FIG. 2 illustrates a schematic diagram of a current control circuit 80, according to some embodiments of the present disclosure.

Referring to FIG. 2, in some embodiments, the current control circuit 80 is electrically coupled to the secondary side 55b of the power supply circuit 50 and is electrically isolated from the primary side 55a. The current control circuit 80 includes a current sensor 82 configured to sense a channel current ($I_{CHANNEL}$) of the corresponding color channel 20/22/24 and to generate a sense signal; an error amplifier (also referred to as a comparator) 86 configured to receive the sense signal from the current sensor 82 and the reference signal ($V_{REF}$) from the channel controller 100, and to generate the feedback signal (also referred to as an error signal/gate control signal) based on a difference between the reference signal and the sense signal; and a voltage-controlled resistor (VCR, e.g., a linear pass element) 88 that is configured to adjust the corresponding channel current by dynamically adjusting a resistance of the VCR 88 based on the feedback signal from the error amplifier 86.

In some embodiments, the current sensor 82 includes a sense resistor ($R_{SENSE}$) 83 that is coupled between the output of the power supply circuit 50 and the corresponding color channel 20/22/24 and is connected electrically in series with the corresponding color channel 20/22/24. The current sensor 82 also includes a current sense circuit 84 that is configured to sense a current of the color channel 20/22/24 by measuring the voltage drop across the sense resistor 83, and to generate the sense signal that is provided to the error amplifier 86 (e.g., to the negative input terminal of the error amplifier 86). However, embodiments of the present disclosure are not limited thereto, and current sensor 82 may include circuit for measuring the channel current and for generating the corresponding sense signal. For example, the current sensor 82 may utilize a hall-effect sensor to measure the channel current.

According to some embodiments, the VCR 88 is electrically connected in series with the sense resistor 83 and the color channel 20/22/24. In some embodiments, the VCR 88 is a field effect transistor (FET), such as a junction FET (JFET) or a metal-oxide-semiconductor FET (MOSFET) that operates in the quasi-saturation region (e.g., linear/ohmic region) and functions as a variable resistor, whose resistance is controlled by the gate voltage. However, embodiments of the present disclosure are not limited thereto, and any suitable 3-terminal or 4-terminal active device may be utilized as the VCR.

According to some embodiments, the feedback signal from the error amplifier 86 controls the resistance of the VCR 88 to regulate the channel current to a desired value, which corresponds to the reference signal. In some examples, the resistance of the VCR 68 may vary from about 5Ω to about 10Ω depending on the error signal. In some embodiments, for each of the color channels 20/22/24, when the channel current rises above the reference signal from the channel controller 100, the feedback signal from the error amplifier 86, which may be provided via a current limiting resistor ($R_{CL}$) 87, increases the resistance of the VCR 88 until the channel current drops to the desired level of the reference signal. Conversely, when the channel current drops below the desired value, i.e., the reference signal, the feedback signal from the error amplifier 86 decreases the resistance of the VCR 88 until the channel current rises to the desired level of the reference signal. Therefore, as the current control circuits 80 dynamically adjusts the resistance of the VCR 88 in response to the instantaneous changes in the channel current, the current control circuit 80 regulates the channel current to the desired level, as determined by the corresponding reference signal.

Referring again to FIG. 1, according to some embodiments, the channel controller 100 generates a reference signal for each of the plurality of color channels 20, 22, and 24 based on the desired color intensity of the channels. For example, when the color channels include a green color channel 20, a blue color channel 22, and a red color channel 24, the channel controller may generate a first reference signal corresponding to the desired green color intensity to send to the first current control circuit 80 associated with the green color channel 20; may generate a second reference signal corresponding to the desired blue color intensity to send to the second current control circuit 80 associated with the blue color channel 22; and may generate a third reference signal corresponding to the desired red color intensity to send to the third current control circuit 80 associated with the red color channel 24. By controlling the color intensity (as measured by lumens, Lm) of each of the red, blue, and green colors output by the color channels 20, 22, and 24, the channel controller 100 may not only enable light dimming, but also adjusts the color mixing of the channels 20, 22, and 24 to replicate light temperatures (temperature in kelvins, K), which follow the black body curve.

In some embodiments, the channel controller 100 determines the color temperature based on a dimmer setting, a time of day, or a combination thereof. For example, at a 1% light output (e.g., lowest dimmer level/setting), the color temperature may be set to 1500 K, at 100% light output (e.g., maximum dimmer level/setting), the color temperature may be set to 6000 K, and at 50% light output (e.g., half dimmer level/setting), the color temperature may be set to 4250 K. The channel controller 100 may receive the dimmer settings from a dimmer controller (or dimmer) 200. In some embodiments, the channel controller 100 may be used to assist in slowly waking up a user by gradually brightening the light and making it more blue in the morning, and making the light more and more warm in the evening hours to help the user fall asleep.

The channel controller 100 determines the color mix (e.g., the intensity of the red, blue, and green light colors) for each color temperature based on a lookup table that provides the light intensities of the different color channels. The tabulated color mix may accurately follow the black body curve.

However, embodiments of the present disclosure are not limited thereto, and in some embodiments, the channel controller 100 utilizes one or more equations to determine the appropriate color mix according to the black body curve.

The following code illustrates an example process for determining the reference signals for the red, green, and blue color channels (RedTarget, GrnTarget, and BluTarget) based on a light intensity/brightness/flux setting (FluxSetting) and a dimmer setting (Warm DimValue).

In the example code above, the maximum total brightness of the lights is determined by a switch setting (FluxSetting), which can be 0 for lowest maximum value, 1 for intermediate maximum value, and 2 for highest maximum value. At each of the switch settings, the intensity of the color channels still follows the black body curve. For each FluxSetting a different lookup table (e.g., redWarmDim_500[ ] vs.

```
// Use linear interpolation between the points on the WarmDimming curves
idx = GlobalStats.WarmDimValue / 1000;
Range_Check_l32(0, &idx, 9);
delta= GlobalStats.WarmDimValue - (idx * 1000);
// Based on our current switch setting, load in the WarmDim targets
switch(GlobalStats.FluxSetting)
    {
        case 0 :
            dimRed = ((redWarmDim_250[idx+1]-redWarmDim_250[idx]) * delta) / 1000
+ redWarmDim_250[idx];
            dimGrn = ((grnWarmDim_250[idx+1]-grnWarmDim_250[idx]) * delta) / 1000
+ grnWarmDim_250[idx];
            dimBlu = ((bluWarmDim_250[idx+1]-bluWarmDim_250[idx]) * delta) / 1000
+ bluWarmDim_250[idx];
            break;
        case 1 :
        default :
            dimRed = ((redWarmDim_350[idx+1]-redWarmDim_350[idx]) * delta) / 1000
+ redWarmDim_350[idx];
            dimGrn = ((grnWarmDim_350[idx+1]-grnWarmDim_350[idx]) * delta) / 1000
+ grnWarmDim_350[idx];
            dimBlu = ((bluWarmDim_350[idx+1]-bluWarmDim_350[idx]) *delta)/ 1000 +
bluWarmDim_350[idx];
            break;
        case 2 :
            dimRed = ((redWarmDim_500[idx+1]-redWarmDim_500[idx]) * delta) / 1000
+ redWarmDim_500[idx];
            dimGrn = ((grnWarmDim_500[idx+1]-grnWarmDim_500[idx]) * delta) / 1000
+ grnWarmDim_500[idx];
            dimBlu = ((bluWarmDim_500[idx+1]-bluWarmDim_500[idx]) *delta)/ 1000 +
bluWarmDim_500[idx];
            break;
    }
    // Update the color targets with linear equations Y=Mx+B
    GlobalStats.RedTarget = (GlobalStats.RedSlopeM * dimRed +
GlobalStats.RedSlopeB) / 10000; // Red Channel
    GlobalStats.GrnTarget = (GlobalStats.GrnSlopeM * dimGrn +
GlobalStats.GrnSlopeB) / 10000; // Green Channel
    GlobalStats.BluTarget = (GlobalStats.BluSlopeM * dimBlu +
GlobalStats.BluSlopeB) / 10000; // Blue Channel
```

In the above code, the WarmDimValue, represents the total flux/output level of light of the three color channels 20, 22, and 24, which is determined by a dimmer level. For example, when the dimmer level is at 0%, the WarmDimValue may be set to zero, and when the dimmer level is at 100%, WarmDimValue may be set to 10,000. The WarmDimValue is used to move along the black body curve. The lookup tables redWarmDim_500[ ], redWarmDim_350[ ], redWarmDim_250[ ], etc., map the dimmer levels to color temperatures, which are represented by their color components dimRed, dimGrn, and dimBlu. In the example above, each lookup table maps 10 discrete dimmer values, as represented by indx (=0, 1 . . . 9), to corresponding 10 color intensity values (dimRed, dimGrn, or dimBlu).

The value delta represents the distance between the WarmDimValue and nearest discrete index value (indx). When a particular WarmDimValue does not correspond to an exact index value, and instead corresponds to a value falling between two index values (e.g., indx and indx+1), the value delta is used by the channel controller 100 to perform linear interpolation to determine the corresponding color intensity values (dimRed, dimGrn, and dimBlu) based on the values stored in the corresponding look up tables.

redWarmDim_350[ ] or redWarmDim_250[ ]) is used to determine the light intensity of each of the color channels.

Once the dim value for each color channel is determined, the channel controller 100 uses a scaling function with a scaler value SlopeM and an offset value SlopeB for each color channel, to determine the reference signals (e.g., RedTarget, GrnTarget, and BluTarget) for each color channel. The scaler value SlopeM and offset value SlopeB may account for the transfer function of the analog circuitry of the current control circuitry 80.

In some examples, a slew-rate may be applied to the reference signals so they do not immediately jump to the RedTarget, GrnTarget, and BluTarget values and instead ramp up to these values over time. This serves to smooth out light transitions.

FIGS. 3A-3B illustrate schematic diagrams of various implementations of the channel controller 100-1/100-2, according to some embodiments of the present disclosure.

Referring to FIGS. 3A-3B, in some embodiments, the channel controller 100-1 includes a processor (e.g., a programmable microprocessor) 110, a memory (e.g., a storage memory) 120, and a plurality of output terminals 130 (e.g., 130, 132, and 134). The processor 110 determines the magnitude for each reference signal that is used by the error amplifiers 86 within the current control circuit 80. The processor 110 is preprogrammed with a lookup table or one or more equations, which may be stored on the memory 120, to track the light intensity of each color channel 20/22/24 and corresponding color temperature with respect to the black body curve. In some examples, the processor 110 determines the light intensities of the three color channels (i.e., the red, blue, and green channels) and provides independent reference signals to the current control circuit 80 via the output terminals 130, 132, and 134. In some examples, the processor 110 may change the temperature of the light emitted by the color channels 20, 20, and 24 so that brighter light intensity corresponds to higher light temperatures and produces white/blue light. Likewise, the processor 110 may adjust the temperature of the light so that dimmer/lower light intensity corresponds to lower light temperatures and produces red/orange light.

Referring to FIG. 3A, in some embodiments, the processor 110 of the channel controller 100-1 generates the reference signals in the form of pulse-width-modulated (PWM) signals, which are converted to analog signals via a plurality of low pass filters 140, 142, and 144. In some examples, each of the low pass filters 140, 142, and 144 includes an R-C filter. The resistance (R) and capacitance (C) values of the low pass filters 140, 142, and 144 may be the same, or may be different from one another.

In some embodiments, a first low pass filter 140 (with resistance $R_1$ and capacitance $C_1$) converts a first PWM reference signal (PWMR) generated at the first output terminal 130 to an analog first reference signal $V_{REFR}$ for setting the resistance of the VCR 88 corresponding to the first color channel (e.g., green color channel 20); a second low pass filter 142 (with resistance $R_2$ and capacitance $C_2$) converts a second PWM reference signal (PWMB) generated at the second output terminal 132 to an analog second reference signal $V_{REFB}$ for setting the resistance of the VCR 88 corresponding to the second color channel (e.g., blue color channel 22); and a third low pass filter 144 (with resistance $R_3$ and capacitance $C_3$) converts a third PWM reference signal (PWMG) generated at the third output terminal 134 to an analog third reference signal $V_{REFG}$ for setting the resistance of the VCR 88 corresponding to the third color channel (e.g., red color channel 24).

Referring to FIG. 3B, in some embodiments, the processor 110 of the channel controller 100-2 generates the reference signals in the form of digital binary signals, which are converted to analog signals via a plurality of integrated digital-to-analog converters (DACs; e.g., DACR, DACB, and DACG) at the output terminals 130, 132, and 134. In such embodiments, the analog reference signals (e.g., $V_{REFR}$, $V_{REFB}$, $V_{REFG}$) generated by the channel controller 100-2 are directly provided to the current control circuit 80 of the corresponding color channels 20, 22, and 24.

As described above, the multi-channel power supply system 30 is able to follow the black body curve by utilizing a processor 110 that references a lookup table or one or more equations to properly mix the light emitted by the color channels. By using the processor (e.g., the microprocessor) 110 to perform color mixing, rather than analog circuitry, the color mixing may be performed in a more accurate manner and done so in a smaller package size, as compared to solutions that rely on analog circuitry to achieve color correction. Further, driving all color channels from the same secondary winding allows the multi-channel power supply system 30 to utilize a smaller and lower-cost transformer, as compared to solutions that drive different color channel through separate secondary windings. As such, in some examples, the entire lighting system 1, including the processor, LEDs, and power electronic circuitry, may be implemented on a same PCB and in a single compact fixture or package, without the need for external power electronic circuitry or other external components.

While the current control circuit 80 facilitates the regulation of each channel current by modifying the dynamic resistance $R_{dyn}$ of the VCR 88, this induced resistance $R_{dyn}$ may lead to additional power losses in the power supply system. The resistance $R_{dyn}$ dissipates energy at a rate of $$P = I^2 * R_{dyn} \qquad \text{(Eq. 1)}$$

where I is the corresponding channel current and P is the power loss at the VCR 88. The voltage drop across the VCR 88 corresponds to the difference between the voltage of the color channel and the output voltage of the secondary winding 54b. According to Equation (1), for a given channel current I, a larger voltage drop across the VCR 88 results in a larger induced resistance $R_{dyn}$. This translates to an increase in power dissipation by the VCR 88, which is in effect wasted energy. Furthermore, high power dissipation may damage the VCRs 88 over time which could adversely affect the performance of the multi-channel power supply system.

Therefore, in some embodiments, the multi-channel power supply system provides overpower protection for the VCR 88 by reducing or minimizing the voltage across the VCR 88. According to some embodiments, the multi-channel power supply system monitors the state of the VCR 88 of one of the current control circuits 80 and adjusts the output voltage of the power supply circuit 50 to reduce or minimize the voltage drop across the VCR 88.

Figure 4:
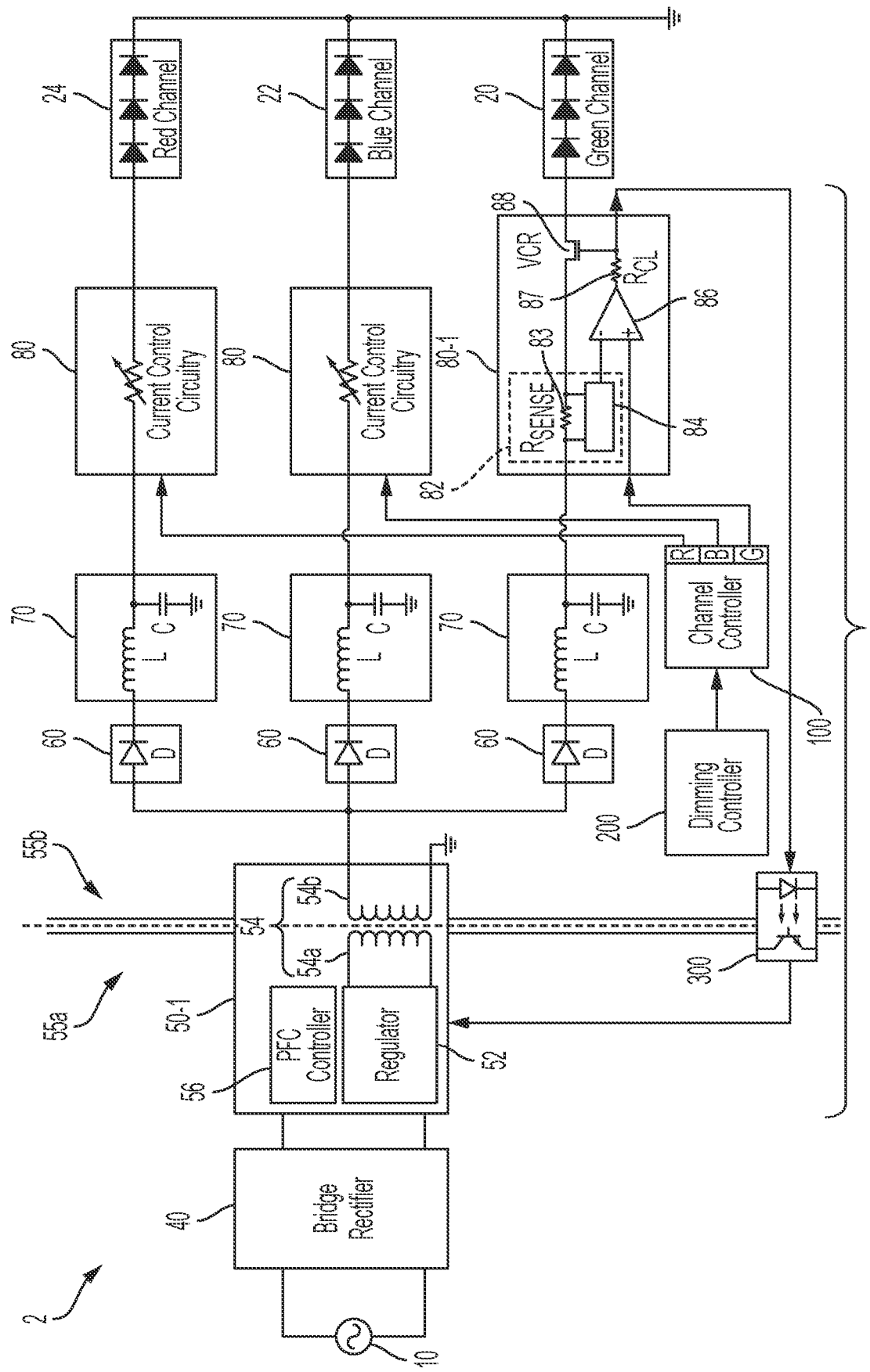
FIG. 4 illustrates a lighting system including a multi-channel power supply system that provides overpower protection for the VCR 88, according to some example embodiments of the present disclosure.

FIG. 4 illustrates a lighting system 2 including a multi-channel power supply system 30-1 that provides overpower protection for the VCR 88, according to some example embodiments of the present disclosure. As the lighting system 2 is substantially the same as the lighting system 1, with the exception of the feedback from the current control circuit 80-1, the output-control mechanism of the power supply circuit 50-1, and the optocoupler 300, the description of common elements between the two lighting systems 1 and 2 may not be repeated here. The following description will instead focus primarily on the differences between the two lighting systems.

Referring to FIG. 4, in some embodiments, the power supply circuit 50-1 monitors the state of the VCR 88 of the current control circuit 80-1 and adjusts its output voltage (i.e., the output voltage of the secondary winding 54b) to reduce or minimize the voltage drop across the VCRs 88. In some examples, current control circuit 80-1 corresponds to (e.g., is associated with) the green color channel 20.

As can be observed from the black body curve diagram, green is the dominant color when mixing light to obtain temperatures at both high and low sides of the black body curve. In other words, the light intensity (and hence the channel current) of the green color channel 20 is always greater than or at least equal to that of the blue or red color channels 22/24. Because of the dynamic resistance of light emitting diodes, higher drive currents also translate to higher drive voltages. Further, the green color channel 20 may have a forward-bias voltage higher than those of the blue and red color channels 22 and 24. Therefore, by providing an output voltage that is at least as high as (e.g., at least slightly higher than) the forward voltage of the green color channel 20, the power supply circuit 50-1 ensures that there is sufficient voltage to drive the blue and red color channels 22 and 24.

In some examples, the feedback signal from the error amplifier 86 that controls the green color channel 20 is communicated through the primary-secondary barrier of the power supply circuit 50-1 via an optocoupler 300, which enables communication between the primary and secondary sides 55a and 55b while maintaining the electrical isolation between the two sides. In some embodiments, the feedback signal is provided to the PFC circuit 56, which may perform power factor correction for the power supply circuit 50-1.

In some embodiments, when the error amplifier 86 of the current control circuit 80-1 determines to increase the drive current of the green color channel 20 (e.g., when increasing the intensity of the green light), the corresponding feedback signal, which is transmitted to the primary side 55a, notifies the power supply circuit 50-1 to increase its output voltage to ensure sufficient drive voltage for the green color channel 20 (and hence the blue and red color channels 22 and 24). Conversely, when the error amplifier 86 of the current control circuit 80-1 determines to decrease the drive current of the green color channel 20 (e.g., when reducing the intensity of the green light), the corresponding feedback signal notifies the power supply circuit 50-1 to decrease its output voltage to prevent excessive power dissipation by the VCRs 88.

As such, by properly controlling the voltage headroom, the power supply circuit 50-1 may provide sufficient drive voltage and current to drive all of the independent color channels, while reducing or minimizing excess power dissipation by the VCRs. The multi-channel power supply system 30-1 controls the headroom of all channels by using only a single feedback/control loop from one dominant color channel (e.g., the green color channel), rather than several different feedback loops. This reduces the number of optocouplers that are needed and greatly simplifies the control logic of the power supply system 30-1, which translates to lower overall cost and size of the system.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept".

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The multi-channel power supply system and/or any other relevant devices or components, such as the PFC circuit and the channel controller, according to embodiments of the present disclosure described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, spirit, and scope of this disclosure, as set forth in the following claims and equivalents thereof.

What is claimed is:

1. A multi-channel power supply system comprising:
  a power supply circuit configured to generate a drive signal at a secondary winding of the power supply circuit for powering a plurality of color channels based on an input power signal;
  a plurality of rectifiers coupled between the power supply circuit and the plurality of color channels, each rectifier of the plurality of rectifiers being directly coupled to a same output of the secondary winding and coupled to a different one of the plurality of color channels;

a first current control circuit coupled to a first color channel of the plurality of color channels and configured to adjust a first channel current of the first color channel based on the drive signal and a first reference signal; and a channel controller configured to control the first current control circuit by generating the first reference signal based on a color temperature according to a black body curve and further based on a dimmer setting from a dimming controller.

2. The multi-channel power supply system of claim 1, wherein the first color channel comprises one or more light emitting diodes (LEDs) having a red color, a blue color, or a green color, the one or more LEDs being configured to output a light intensity corresponding to the first channel current.

3. The multi-channel power supply system of claim 1, wherein the first current control circuit comprises:

a current sensor configured to sense the first channel current of the first color channel and to generate a first sense signal;

an error amplifier configured to receive the first sense signal and the first reference signal, and to generate a gate control signal based on a difference between the first reference signal and the first sense signal; and a voltage-controlled resistor (VCR) configured to adjust the first channel current by dynamically adjusting a resistance of the VCR based on the gate control signal.

4. The multi-channel power supply system of claim 3, wherein the current sensor comprises:

a sense resistor electrically coupled in series with the VCR and the first color channel; and a current sense circuit configured to generate the first sense signal based on a voltage drop across the sense resistor.

5. The multi-channel power supply system of claim 4, wherein the resistance of the VCR varies from 5 Ω to 10 Ω depending on the gate control signal.

6. The multi-channel power supply system of claim 3, wherein the VCR comprises:

a field effect transistor (FET) having a gate electrically coupled to an output of the error amplifier, wherein the error amplifier is further configured to maintain the FET in an ohmic region of operation.

7. The multi-channel power supply system of claim 1, wherein the color temperature is based on at least one of the dimmer setting and a time of day, and wherein the channel controller is configured to generate the first reference signal based on the color temperature by referencing a lookup table or a formula.

8. The multi-channel power supply system of claim 1, wherein the channel controller comprises:

a pulse-width modulation (PWM) generator configured to generate a PWM signal corresponding to the first reference signal; and a low-pass filter configured to filter the PWM signal to generate the first reference signal.

9. The multi-channel power supply system of claim 1, wherein the channel controller comprises:

a digital circuit configured to generate a digital signal corresponding to the first reference signal; and a digital-to-analog converter (DAC) configured to convert the digital signal to the first reference signal.

10. The multi-channel power supply system of claim 1, wherein the plurality of rectifiers comprise:

a first rectifier coupled to the secondary winding of the power supply circuit and configured to prevent a reverse current at the first color channel.

11. The multi-channel power supply system of claim 1, further comprising:

a second current control circuit coupled to a second color channel of the plurality of color channels and configured to adjust a second channel current of the second color channel based on the drive signal and a second reference signal; and a third current control circuit coupled to a third color channel of the plurality of color channels and configured to adjust a third channel current of the third color channel based on the drive signal and a third reference signal, wherein the channel controller is further configured generate the second and third reference signals based on the color temperature.

12. The multi-channel power supply system of claim 11, wherein the first color channel comprises one or more green light emitting diodes (LEDs), wherein the second color channel comprises one or more blue LEDs, and wherein the third color channel comprises one or more red LEDs.

13. The multi-channel power supply system of claim 11, wherein the plurality of rectifiers further comprise:

a second rectifier coupled to the secondary winding of the power supply circuit and configured to prevent a reverse current at the second color channel; and a third rectifier coupled to the secondary winding of the power supply circuit and configured to prevent a reverse current at the third color channel, and wherein the multi-channel power supply system further comprises:

a second low pass filter coupled between the second rectifier and the second color channel and configured to produce the second channel current as a second DC current based on the drive signal; and a third low pass filter coupled between the third rectifier and the third color channel and configured to produce the third channel current as a third DC current based on the drive signal.

14. The multi-channel power supply system of claim 11, wherein the first channel current is greater than or equal to each of the second and third channel currents.

15. The multi-channel power supply system of claim 11, wherein the first color channel has a forward voltage that is greater than or equal to that of each of the second and third color channels.

16. The multi-channel power supply system of claim 1, wherein the power supply circuit comprises:

a voltage regulator; and a transformer having a primary winding coupled to the voltage regulator and the secondary winding electrically isolated from the primary winding and coupled to the first current control circuit.

17. The multi-channel power supply system of claim 1, further comprising:

a rectifier circuit configured to rectify the input power signal to generate a rectified signal having a single polarity, wherein the power supply circuit is configured to generate the drive signal based on the rectified signal.

18. The multi-channel power supply system of claim 17, wherein the rectifier circuit is a bridge rectifier and the input power signal is an alternating-current (AC) signal.

19. The multi-channel power supply system of claim 1, further comprising:
a first low pass filter coupled between a first rectifier of the plurality of rectifiers and a first color channel of the plurality of color channels and configured to produce a first channel current as a first DC current based on the drive signal, the first low pass filter and the first rectifier being electrically in series.

20. A multi-channel power supply system comprising:
a power supply circuit configured to generate a drive signal at a secondary winding of the power supply circuit for powering a plurality of color channels based on an input power signal, the plurality of color channels comprising a red color channel, a blue color channel, and a green color channel;
a plurality of rectifiers coupled between the power supply circuit and the plurality of color channels, each rectifier of the plurality of rectifiers being directly coupled to a same output of the secondary winding and coupled to a different one of the plurality of color channels;
a first current control circuit coupled to the green color channel and configured to adjust the first channel current of the green color channel based on the drive signal and a first reference signal;
a second current control circuit coupled to the blue color channel and configured to adjust a second channel current of the blue color channel based on the drive signal and a second reference signal;
a third current control circuit coupled to the red color channel and configured to adjust a third channel current of the red color channel based on the drive signal and a third reference signal; and
a channel controller configured to control the first current control circuit by generating the first, second, and third reference signals based on a color temperature according to a black body curve and further based on a dimmer setting from a dimming controller.

* * * * *

UNITED STATES PATENT AND TRADEMARK OFFICE
CERTIFICATE OF CORRECTION

| | |
|---|---|
| PATENT NO. | : 11,882,632 B2 |
| APPLICATION NO. | : 17/473914 |
| DATED | : January 23, 2024 |
| INVENTOR(S) | : Michael Archer et al. |

It is certified that error appears in the above-identified patent and that said Letters Patent is hereby corrected as shown below:

On the Title Page

In item (57), in Column 2, under "Abstract", Line 8, after "configured" insert -- to --.

In the Claims

In Column 15, Line 39, in Claim 5, delete "10 Ω" and insert -- 10 kΩ --.

Signed and Sealed this
Thirtieth Day of April, 2024

Katherine Kelly Vidal
*Director of the United States Patent and Trademark Office*